United States Patent
Kim et al.

(10) Patent No.: US 9,348,591 B2
(45) Date of Patent: May 24, 2016

(54) MULTI-LEVEL TRACKING OF IN-USE STATE OF CACHE LINES

(75) Inventors: Ilhyun Kim, Beaverton, OR (US); Chen Koren, Folsom, CA (US); Alexandre J. Farcy, Hillsboro, OR (US); Robert L. Hinton, Hillsboro, OR (US); Choon Wei Khor, Sungai Dua (MY); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 13/992,729

(22) PCT Filed: Dec. 29, 2011

(86) PCT No.: PCT/US2011/067747
§ 371 (c)(1),
(2), (4) Date: Jun. 8, 2013

(87) PCT Pub. No.: WO2013/101026
PCT Pub. Date: Jul. 4, 2013

(65) Prior Publication Data
US 2013/0275733 A1   Oct. 17, 2013

(51) Int. Cl.
*G06F 9/30* (2006.01)
*G06F 9/38* (2006.01)

(52) U.S. Cl.
CPC ........ *G06F 9/30079* (2013.01); *G06F 9/30047* (2013.01); *G06F 9/3814* (2013.01)

(58) Field of Classification Search
None
See application file for complete search history.

(56) References Cited

U.S. PATENT DOCUMENTS

| | | | |
|---|---|---|---|
| 7,594,096 B2 | 9/2009 | Eickemeyer et al. | |
| 7,793,049 B2 * | 9/2010 | Cain | G06F 12/126 711/133 |
| 7,805,574 B2 | 9/2010 | Bell, Jr. et al. | |
| 7,925,834 B2 | 4/2011 | Smith et al. | |
| 8,364,898 B2 * | 1/2013 | Balakrishnan | G06F 12/0808 711/122 |
| 8,990,502 B2 * | 3/2015 | Koltsidas | G06F 12/0868 711/122 |
| 2006/0230235 A1 * | 10/2006 | O'Connor | G06F 12/128 711/133 |
| 2008/0065865 A1 | 3/2008 | Kim et al. | |
| 2010/0153654 A1 * | 6/2010 | Vorbach | G06F 12/0862 711/137 |

OTHER PUBLICATIONS

PCT International Search Report for PCT Counterpart Application No. PCT/US2011/067747, 3 pgs., (Jun. 8, 2012).

(Continued)

*Primary Examiner* — Corey S Faherty
(74) *Attorney, Agent, or Firm* — Nicholson De Vos Webster & Elliott, LLP

(57) ABSTRACT

This disclosure includes tracking of in-use states of cache lines to improve throughput of pipelines and thus increase performance of processors. Access data for a number of sets of instructions stored in an instruction cache may be tracked using an in-use array in a first array until the data for one or more of those sets reach a threshold condition. A second array may then be used as the in-use array to track the sets of instructions after a micro-operation is inserted into the pipeline. When the micro-operation retires from the pipeline, the first array may be cleared. The process may repeat after the second array reaches the threshold condition. During the tracking, an in-use state for an instruction line may be detected by inspecting a corresponding bit in each of the arrays. Additional arrays may also be used to track the in-use state.

14 Claims, 6 Drawing Sheets

(56) References Cited

OTHER PUBLICATIONS

PCT Written Opinion of the International Searching Authority for PCT Counterpart Application No. PCT/US2011/067747, 4 pgs., (Jun. 8, 2012).

PCT Notification concerning Transmittal of International Preliminary Report on Patentability (Chapter I of the Patent Cooperation Treaty) for PCT Counterpart Application No. PCT/US2011/067747, 6 pgs., (Jul. 10, 2014).

* cited by examiner

MULTI-LEVEL TRACKING OF IN-USE STATE OF CACHE LINES

CROSS-REFERENCE TO RELATED APPLICATION

This patent application is a U.S. National Phase Application under 35 U.S.C. §371 of International Application No. PCT/US2011/067747, filed Dec. 29, 2011, entitled MULTI-LEVEL TRACKING OF IN-USE STATE OF CACHE LINES.

TECHNICAL FIELD

This disclosure relates generally to the field of microprocessors. In particular, this disclosure relates to tracking an in-use state of cache lines.

BACKGROUND ART

In modern processors, execution pipelines are often used to process instructions. To achieve correct functionality, a processor adheres to processor inclusion such that any instruction line that has been delivered into an execution pipeline of a processor may later need to be re-delivered in an unmodified state. Therefore, deallocation or eviction of the line, in particular from an instruction cache, may not take place until all instructions from that instruction line are no longer being processed in the execution pipeline.

A way to adhere to processor inclusion is to serialize the execution pipeline to clear the pipeline of instructions before deallocation or eviction of the cache line. But this may limit a processing capacity of the processor by creating downtime in the execution pipeline.

A processor may employ an inclusion buffer such as a victim cache in order to avoid the frequent pipeline serializations. A victim cache holds evicted lines until it can be determined that no instructions from an instruction line are being processed in the execution pipeline. One way to make such a determination is to insert a special micro-operation into the execution pipeline when an entry is allocated into the victim cache. Design constraints may limit a victim cache to store only a few entries (e.g., four or eight). If too many instruction lines are evicted from the instruction cache prior to a victim cache deallocation, the victim cache can fill up resulting in unwanted stalls for the execution pipeline.

Another technique includes a single level in-use scheme described in U.S. Patent Application 2008/0065865. An in-use field for each entry of a storage unit (such as an instruction cache and/or an ITLB) may be utilized to determine if it is allowed to modify that entry. For example, if the in-use bit indicates that the corresponding entry is unused, that entry may be removed or replaced without further latency. However, this single-level scheme (i.e. one in-use bit per entry) is imprecise because it does not track the retirement of instructions but simply relies on the pipeline serializations that mark all entries not in-use. The in-use array starts with all zeros. As time passes, more and more entries are marked as in-use, making it harder to find non-in-use entries to freely replace. Eventually, most bits become marked as in-use even although some of these bits may not actually be in-use, which results in pipeline serializations and performance penalty U.S. Pat. No. 7,925,834 describes another technique to adopt a filter mechanism (either the in-use bits, or the LRU hint based scheme) that further reduces the number of evictions into victim cache. When the in-use tracking mechanism's filtering efficiency is found to be low based on certain criteria (i.e. too many entries are falsely marked as in-use), all in-use bits in the filter mechanism are cleared but instead a global marker may mark all instruction lines as in-use while the inserted micro-operation is in the execution pipeline. This approach may also limit the processing capacity of the processor by falsely marking all lines as in-use while the micro-operation is in the pipeline.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure includes tracking of in-use states of cache lines of instruction cache to improve throughput of pipelines and thus increase performance of processors.

In some embodiments, an in-use state for a number of sets of instructions stored in an instruction cache is tracked in an in-use array using a first array until in-use bits for one or more of those sets reach a predetermined threshold condition. A second array may then be used to track the sets of instructions after a micro-operation is inserted into the pipeline. When the micro-operation retires from the pipeline (exits), the first array may be cleared (flushed). During the tracking, an in-use state for an instruction line may be detected by inspecting corresponding bits in all the arrays.

Bits in the in-use array are updated whenever an instruction cache (IC) entry is accessed. A bit in the in-use array that corresponds to the entry may be updated to show the in-use state (e.g., change from 0 to 1). After there is a write into an IC entry from the instruction stream buffer (ISB), the in-use bit in the corresponding entry may be set in the in-use array. For example, an in-use bit==1 may imply that the corresponding cache entry may be in-use, and hence the machine is not allowed to replace the line until the in-use bit is reset to zero (0) as disclosed herein.

By using two or more arrays to track the in-use state of instructions stored in the instruction cache, the tracking is more accurate even during a transition time while the micro-operation passes through the pipeline. Thus, the techniques described herein may preserve at least some of the entry-specific information of the in-use state from the first array while the micro-operation passes through the pipeline and tracking is performed on the second array. These techniques may enable processors to minimize false tracking of temporal in-useness.

The techniques and apparatuses described herein may be implemented in a number of ways. Example implementations are provided below with reference to the following figures.

Illustrative Device

Figure 1:
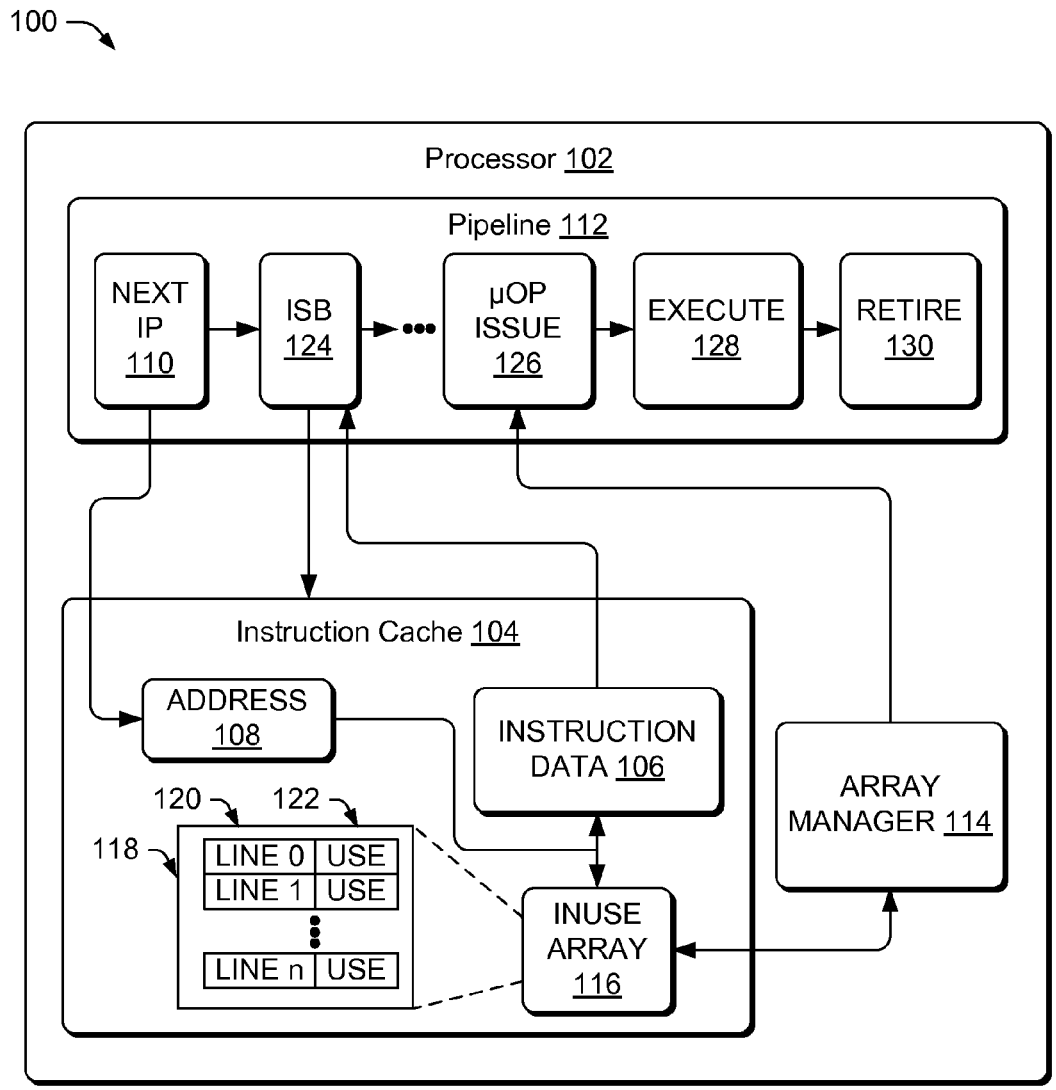
FIG. 1 is a schematic diagram of an illustrative processor for multi-level tracking of in-use states of cache lines.

FIG. 1 shows an illustrative environment 100 including a processor 102 for multi-level tracking of in-use states of cache lines. The processor 102 is representative of any type of computer processor having one or more cores and/or implemented singly or with other processors which may share some resources. The processor 102 may include an instruction cache (IC) 104 having a plurality of sets of instruction data 106 for corresponding addresses. For one embodiment, 64 such sets may be assigned according to address bits of an address 108 provided by a next instruction pointer (IP) stage 110 of a pipeline 112. An array manager 114 may track access data in an in-use array 116 for the sets of the instruction data 106 in the instruction cache 104. The instruction cache 104 may include one or more entries 118. Each entry 118 may include a cache line portion 120 (that may store data corresponding to a fetched and/or decoded instruction including μOPs) and an in-use field 122 (which may be a single bit in some embodiments).

The array manager 114 may track the access data in-use array 116 for the sets of the instruction data 106 in the instruction cache 104 at least until the in-use array for one or more of the sets reach a predetermined threshold condition in the first array. For example, the array manager 114 may track the access data in the in-use array 116 as in-use states that correspond to the one or more sets. When the first array reaches the predetermined threshold condition, the array manager 114 may stop tracking the access data in the in-use array 116 with the first array and begin tracking the access data in the in-use array with a second array. For example, the array manager 114 may track the access data in the in-use array 116 as in-use states that correspond to one or more sets. If many in-use bits are marked as in-use in the first-level array, the machine may have difficulties in finding non-in-use entries as replacement victims, potentially slowing down the machine performance. Therefore, the array manager 114 may trigger the following actions when more than e.g. X % of in-use bits are marked as one (1) in the first-level array, in an attempt to proactively clear as many of the bits as possible.

In some embodiments, the pipeline 112 accesses the instruction cache 104 through the next instruction pointer stage 110 and the instruction streaming buffer (ISB) 124. The pipeline 112 also includes a μOP issue 126 to issue, for execution by an execution stage 128, micro-operations corresponding to instructions of the sets of instruction data 106 and/or instruction streaming buffer 124. The pipeline 112 also includes a retirement stage 130 to retire the micro-operations upon completion of their execution by the execution stage 128.

The μOP issue 126 of the pipeline 112 may issue a marker (e.g., a micro-operation) into the pipeline 112 responsive to the first array reaching the predetermined threshold condition. The array manager 114 may change an active array pointer to a second array and begin to track the access data in the in-use array 116 in the second array.

In some embodiments, the array manager 114 may not permit allocation of entry storage when the instruction cache 104 is full as determined or detected by an analysis of bits that track the in-use state of corresponding instructions in at least the first and second arrays.

When the marker reaches the retirement state 130 of the pipeline, the first array may be cleared. The second array may be continued to be used to track the access data in the in-use array until the second array reaches the a predetermined threshold condition, at which point the array manager 114 may again change the active array pointer and begin to track the access data in the in-use array using the first array as discussed above.

By using multiple arrays, the array manager may fine-tune a determination or detection of the in-use state of cache lines in a more precisely fashion without losing entry-specific information on in-useness by assuming all cache lines are in-use and/or waiting for a pipeline serialization to clear the in-use state.

Illustrative Operation

Figure 2:
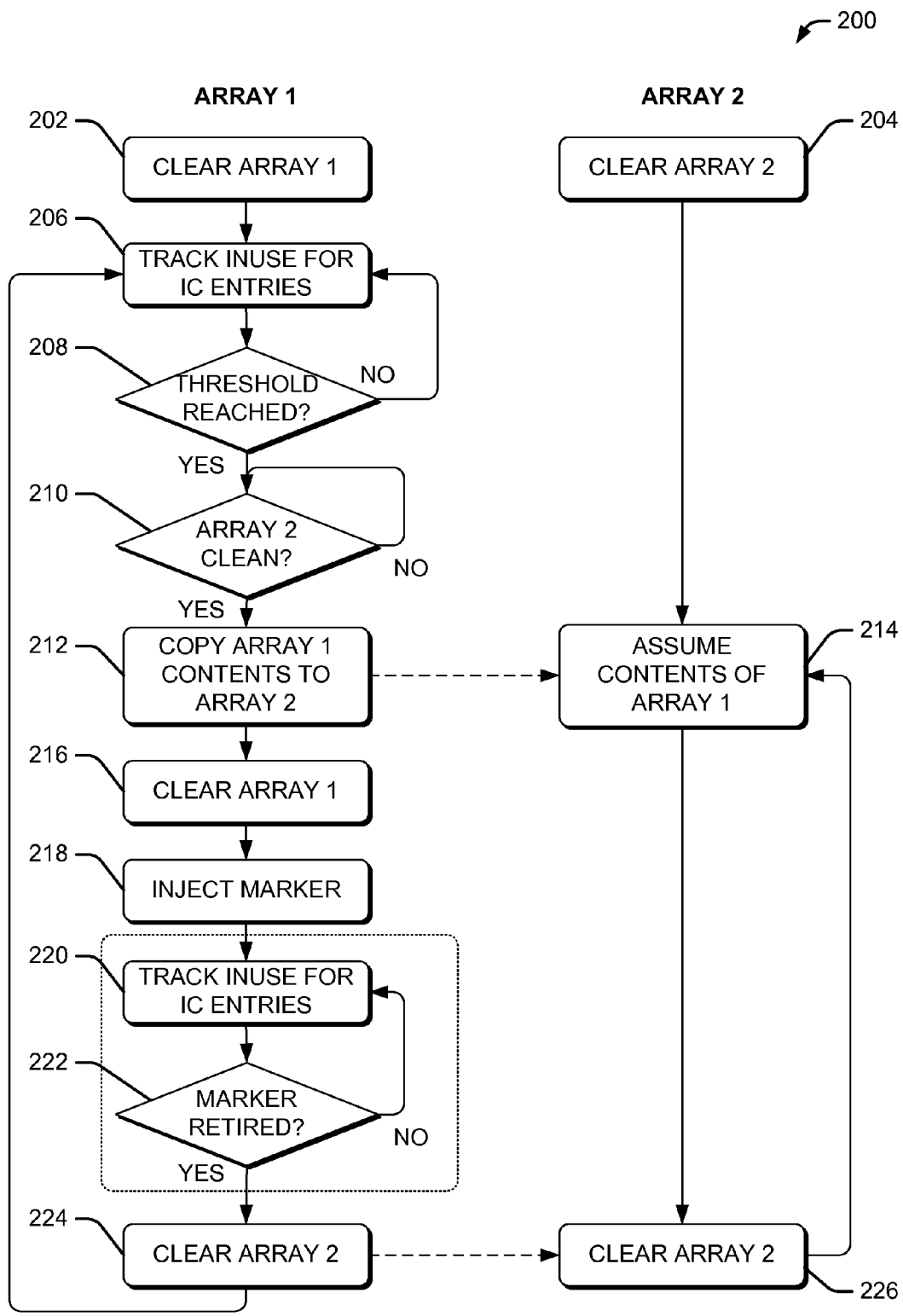
FIG. 2 is a flow diagram of an illustrative process to track in-use states of cache lines using two arrays.

FIG. 2 is a flow diagram of an illustrative process 200 to track in-use states of cache lines using two arrays. The process 200 is illustrated as a collection of blocks in a logical flow graph, which represent a sequence of operations that can be implemented in hardware, software, or a combination thereof. The collection of blocks is organized under respective illustrative arrays (e.g., array 1 and array 2). However, additional arrays may be used in some embodiments. The illustrative arrays may be associated with the various operations described in the blocks. The order in which the operations are described is not intended to be construed as a limitation, and any number of the described blocks can be combined in any order and/or in parallel to implement the process. The process 200 is described with reference to the environment 100. Of course, the process 200 may be performed in other similar and/or different environments.

The process 200 may begin by resetting or purging array 1 at 202 and resetting or purging array 2 at 204. In some embodiments, the process 200 may begin having both array 1 and array 2 being reset or cleared without having to purge or reset the arrays.

At 206, the array manager 114 may track, in array 1, access data in the in-use array for a plurality of sets of instruction data 106 in the instruction cache 104 to detect an in-use state for each of the plurality of sets. The access data in the in-use array may be read/write updates of instruction data.

At 208, the array manager 114 may compare the tracked access data in the in-use array against a threshold condition. When the threshold condition is not reached (or possibly not exceeded), then the array manager 114 may continue the tracking at the operation 206 (following the "no" route from the decision operation 208). However, when the threshold condition is reached at 208, the array manager 114 may stop the tracking in the array 1.

At 210, the array manager 114 may detect whether array 2 is clean. When array 2 is cleared or reset at 204, then processing may continue to an operation 212. However, in some instances, such as when the process 200 has been running multiple cycles by looping through the operations described herein, the operation 210 may result in a detection that array 2 is not clear. This may occur when the marker has not retired from the pipeline or for other possible reasons. When the array 2 is not clear, then the process 200 may delay and then check to detect whether array 2 has been cleared at a subsequent point in time (following the "no" route from the decision operation 210).

At 212, the array manager 114 may copy the contents of array 1 into array 2. At 214, array 2 may receive the contents of array 1. In some embodiments, the array manager 114 may achieve the same results by switching an active array pointer corresponding to the arrays. The active array pointer is discussed with reference to FIGS. 4 and 5.

At 216, the array manager 114 may clear the contents of array 1. When a pointer change is used, array 1 may not include any tracking data during a first run through the cycle.

At 218, the μOP issue 126 may inject a marker operation at the execution stage 128. The marker operation may be a micro-operation. At 220, the array manager 114 may track, in array 1, access data in the in-use array for a plurality of sets of instruction data 106 in the instruction cache 104 to detect an in-use state for each of the plurality of sets. The operation 220 may be performed in a same manner as the operation 206, described above.

At 222, the array manager 114 may detect whether the marker operation has retired. The μOP issue 126 may retire the marker operation at the retirement stage 130 when the marker operation has completed it flow through the pipeline 112. When the marker operation remains in the pipeline and is not retired, then the array manager 114 may continue the tracking at the operation 220 (following the "no" route from the decision operation 222). However, when the marker operation is retired, the process 200 may advance to an operation 224.

At 224, the array manager 114 may clear the contents of array 2. The array manager 114 clears the contents of array 2 because the pipeline has been effectively cleared by the marker operation running the duration of the pipeline. The tracked access data in the in-use array in the array 1 now represents all active data in the instruction cache since the injection of marker at 218. However, prior to the operation 224, the in-use state of the instruction cache is detected by the in-use array stored in both the array 1 and the array 2, such as by using an "OR" operator. At 226, the array 2 may be cleared.

The process 200 may continue at 206 by continuing the tracking of the access data in the in-use array in the array 1 (which began at the operation 220). The process 200 may continue though the various operations as described above, which may periodically clear the contents of the arrays and/or change active array pointers of the arrays.

During the process 200, the instruction cache 104 may detect whether an entry storage location in the instruction cache is available and capable for allocation based at least in part on the in-use array in the array 1 and the array 2 that track the in-use state of the one or more sets, which is described in greater detail below. For example, the in-use state of the sets of the instruction cache may be detected as shown in Equation 1 as follows:

$$\text{In-use} = \text{Array1}(x)\text{in-use} \| \text{Array2}(x)\text{in-use}, \qquad \text{EQU. (1)}$$

where x corresponds to the particular instruction. By using the in-use array as array 1 and array 2, the in-use result of Equation 1 creates less false in-use state indications than implementations where all the access data in the in-use array is marked as in-use when the marker operation flows through the pipeline.

Figure 3:
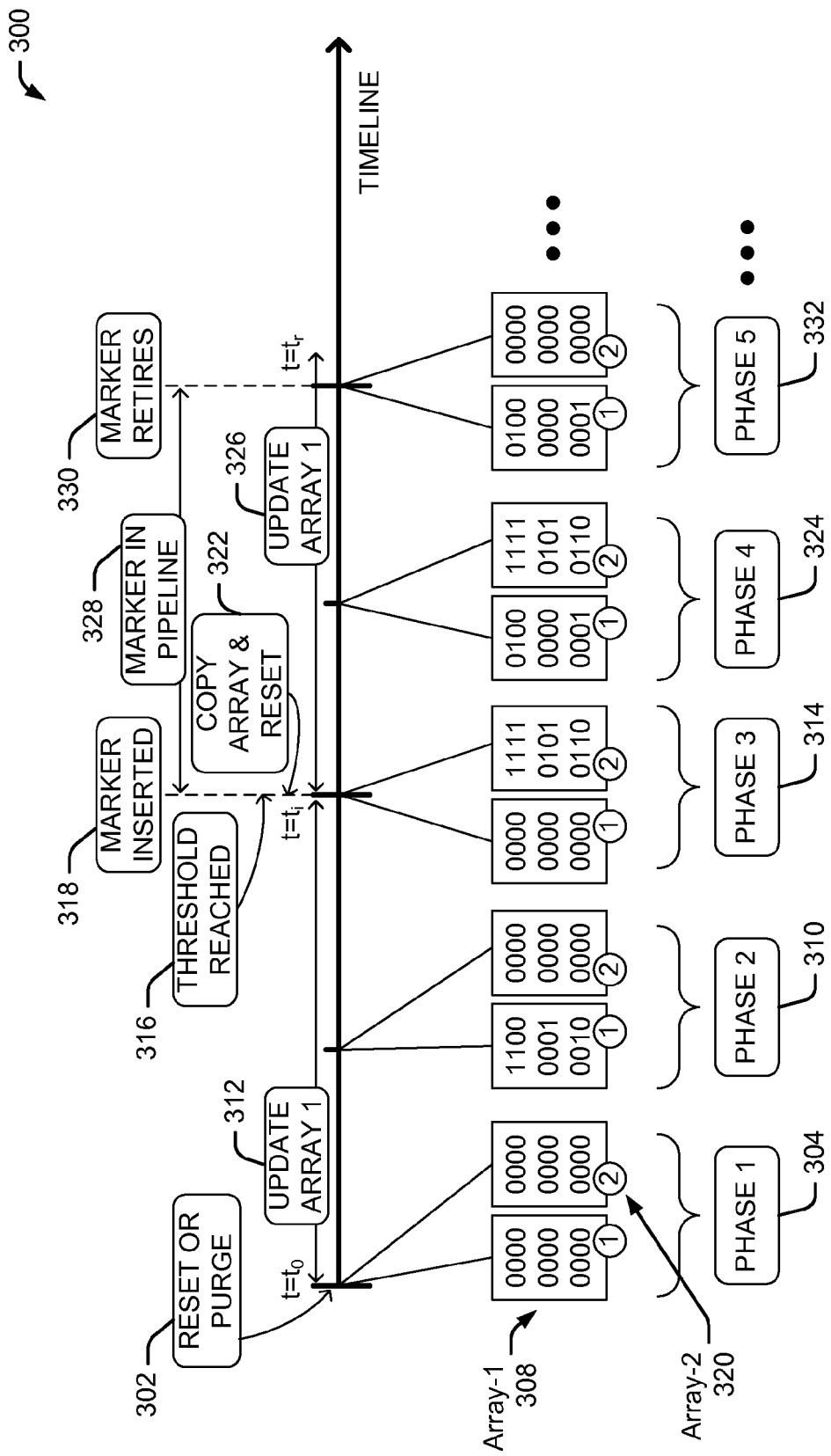
FIG. 3 is a schematic diagram showing an illustrative timeline that tracks in-use states of cache lines using multiple arrays.

FIG. 3 shows a timeline 300 that illustrates activities described with reference to FIG. 2. The timeline 300 includes events illustrating tracking of in-use states of cache lines using two arrays, which include array-1 and array-2. However, additional arrays may be used to track the in-use state of the cache lines.

At time (t)=0, the array manager 114 may reset or purge the arrays at block 302. As shown in phase-1 304, each of the arrays may include zeros, which may indicate that the in-use array is null (inactive).

As the lines of cache become active due to write/read actions, the array-1 308 may begin to track the in-use state as shown in phase-2 310 at block 312. For example, array-1 308 may include some values of "1" that indicate an in-use state for some sets of the instructions. As the time approaches at time ($t_i$), the in-use array stored in array-1 308 may converge upon a threshold condition.

At $t_i$, the in-use array in the array-1 308 may reach the threshold condition as shown in phase-3 314 at block 316. The threshold condition may be predetermined and may correspond to a number of remaining inactive locations, a percentage of in-use state, and so forth.

At $t_i$, the marker operation may be inserted (the operation 218) at block 318. The data from array-1 308 may be copied to array-2 320 (as described with reference to FIG. 2) at block 322. Similarly, array-1 may be reset (thus assuming the values of array-2). Moving to phase-4 324, at 322 the array manager 114 may track the access data in the in-use array using array-1 308 at 326, which is empty following the copying of the array at 322. Array-2 320 may include the same in-use array tracked up until time=$t_i$. As described in the process 200, the copying of the array at 322 copies the contents of array-1 to array-2, and then tracks the access data in the in-use array with array-1, which is cleared before resuming the tracking of the access data.

As shown in phase-4 324, both array-1 308 and array-2 320 include in-use arrays illustrated by sets of data (1,0). To detect which sets of the instructions are in-use in phase 4 (or any other phase described herein), corresponding bits in the arrays may be subjected to an OR condition such that if either contain a 1, then the bit (and corresponding instruction) is assumed to be in-use. For example, the bit in the upper left-hand corner of the arrays is determined as follows: phase 1, [0,0]→0 (not in-use); phase 2 [1,0]→1 (in-use); phase 3 [0,1]→1 (in-use); phase 4 [0,1]→1 (in-use); phase 5 [0,0]→0 (not in-use).

Between time (t)=$t_i$ and (t)=$t_r$, the marker may be in the pipeline at block 328. At time (t)=$t_r$, the marker may be retired from the pipeline at block 330. As shown in phase-5 332, which occurs at $t_r$, the array manager 114 may clear array-2 302 while continuing to track the access data in the in-use array (array-1). Array-1 320 may continue to be updated after $t_r$ and until array-1 reaches the threshold condition as discussed above. At this point, the process may continue as described above and in the process 200.

Illustrative Operation using an Active Array Pointer

Figure 4:
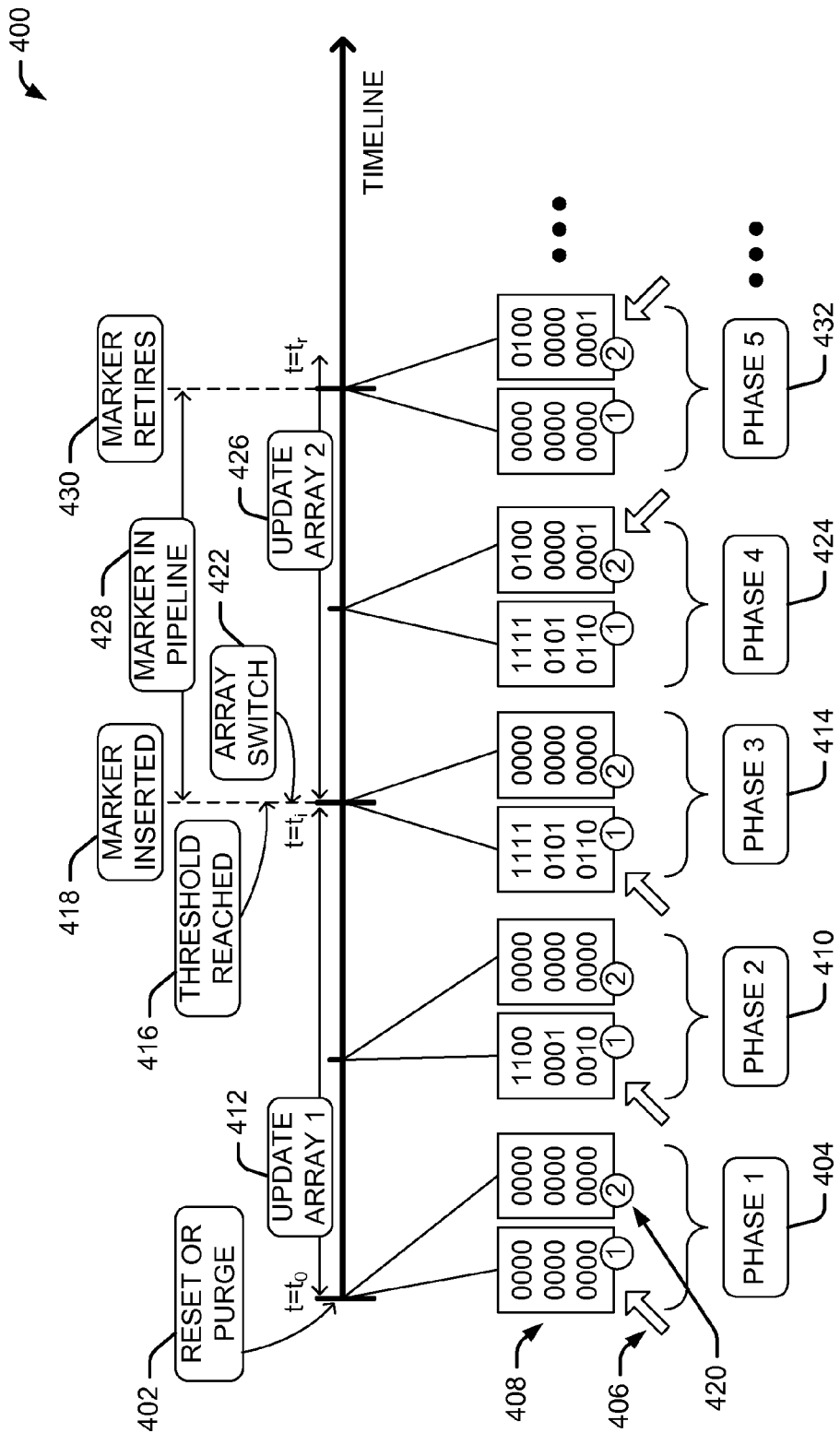
FIG. 4 is a schematic diagram showing an illustrative timeline that tracks in-use states of cache lines using multiple arrays and using an active array pointer.

FIG. 4 shows another timeline 400 that is similar to the timeline 300 but uses an active array pointer to switch between arrays rather than copying contents between the arrays (e.g., the operation 212, 214 in the process 200). Again, the timeline 400 includes events illustrating tracking of in-use states of cache lines using two arrays, which include array-1 and array-2. However, additional arrays may be used to track the in-use state of the cache lines.

At time (t)=0, the array manager 114 may reset or purge the arrays at block 402. As shown in phase-1 404, each of the arrays may include zeros, which may indicate that the in-use array is null (inactive). An active array pointer 406 may be set to array-1 408 to indicate that array-1 is to track the access data in the in-use array.

As the lines of cache become active due to write/read actions, the array-1 408 may begin to track the in-use state as shown in phase-2 410 at block 412. For example, array-1 408 may include some values of "1" that indicate an in-use state for some sets of the instructions. As the time approaches at time ($t_i$), the in-use array stored in array-1 408 may converge upon a threshold condition.

At $t_i$, the in-use array in the array-1 408 may reach the threshold condition as shown in phase-3 414 at block 416. The threshold condition may be predetermined and may correspond to a number of remaining inactive locations, a percentage of in-use state, and so forth.

At $t_i$, the marker operation may be inserted at block 418. The active array pointer 406 may move from array-1 408 to array-2 420 at block 422. Moving to phase-4 424, with the marker pointing to array-2 420, the array manager 114 may begin tracking the access data in the in-use array using array-2 at block 426. Array-1 408 may include the same in-use array tracked up until time=$t_i$. In the discussion of FIG. 2, the process 200 describes switching arrays, and then tracking the access data in the in-use array with array-1. In FIG. 4, the active array pointer 406 moves to array-2 420 which then tracks the access data in the in-use array with array-2. Thus, either implementation may achieve the same results.

As shown in phase-4 424, both array-1 408 and array-2 420 include in-use arrays illustrated by sets of data (1,0). To detect which sets of the instructions are in-use in phase 4 (or any other phase described herein), corresponding bits in the arrays may be subjected to an OR condition such that if either contain a 1, then the bit (and corresponding instruction) is assumed to be in-use. For example, the bit in the upper left-hand corner of the arrays is determined as follows: phase 1, [0,0]→0 (not in-use); phase 2 [1,0]→1 (in-use); phase 3 [1,0]→1 (in-use); phase 4 [1,0]→1 (in-use); phase 5 [0,0]→0 (not in-use).

Between time (t)=$t_i$ and (t)=$t_r$, the marker may be in the pipeline at block 428. At time (t)=$t_r$, the marker may be retired from the pipeline at block 430. As shown in phase-5 432, which occurs at $t_r$, the array manager 114 may clear array-1 408 (array without the active array pointer or the previously used array) while continuing to have the active array pointer 406 at array-2 420 to track the access data in the in-use array. Array-2 420 may continue to be updated after $t_r$ and until array-2 reaches the threshold condition as discussed above. At this point, the process may again move the active array pointer 406 and continue as described above and in the process 200. In some embodiments, the marker may include a designator that indicates which array can be cleared when the marker is retired.

Figure 5:
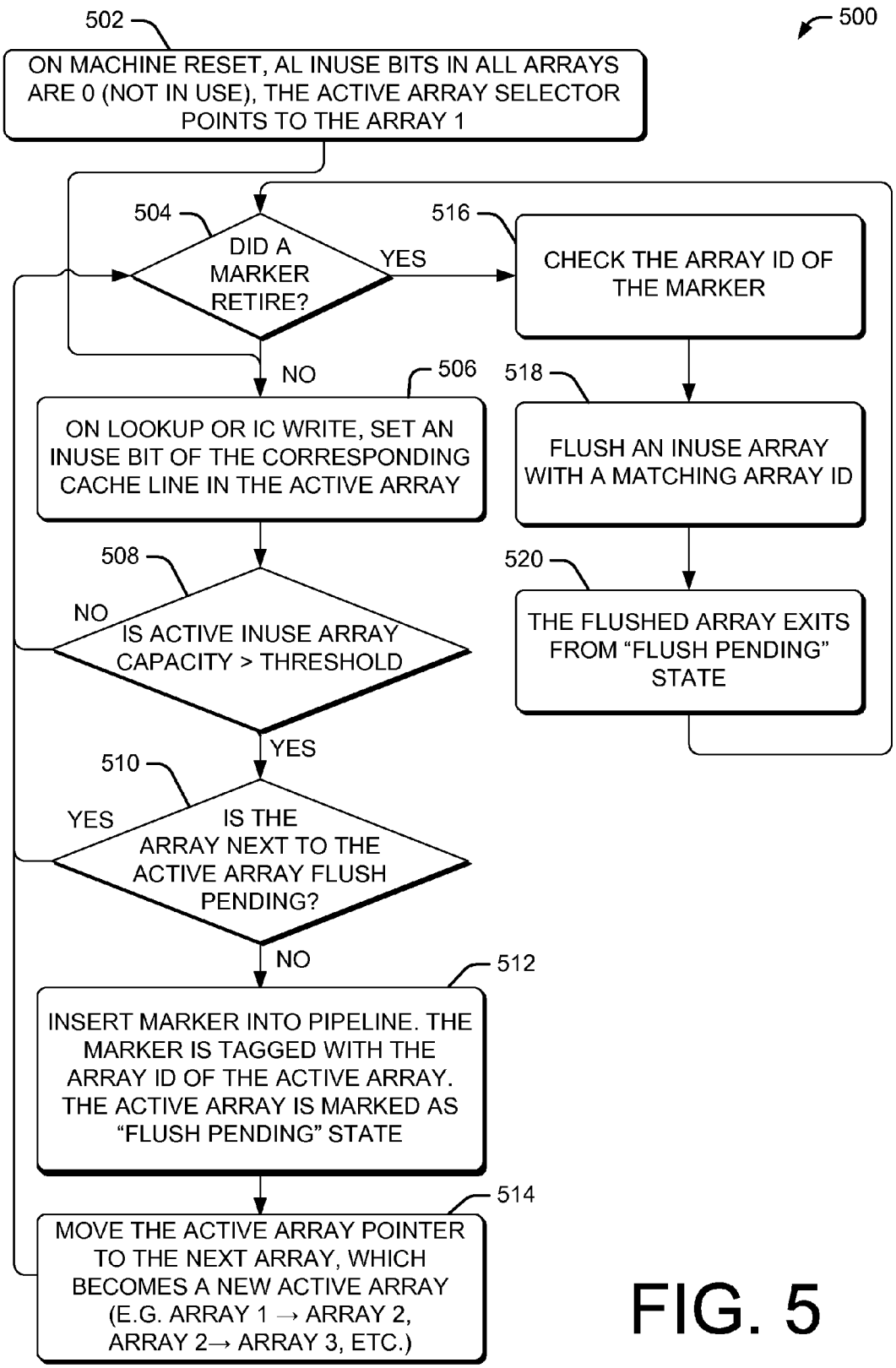
FIG. 5 is a flow diagram of an illustrative process to track in-use states of cache lines using multiple arrays.

FIG. 5 is a flow diagram of an illustrative process 500 to track in-use states of cache lines using multiple N arrays. The process 500 is illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the process. The process 500 is described with reference to the environment 100. Of course, the process 500 may be performed in other similar and/or different environments.

At 502, on machine reset, all the in-use bits in all arrays may be set to zero to indicate that the corresponding instructions are not in-use. The active array pointer (indicating the active array where in-use bit updates are made) may point to the array 1 (e.g. the first array of a plurality of arrays).

At 504, the array manager 114 may detect whether a marker retired. As discussed above, the μOP issue 126 may initiate, at the execution state 128, markers into the pipeline 112. The marker may retire at a retirement state 130 when the marker has passed through the pipeline.

When the marker did not retire (following the "no" route from the decision operation 504), the process 500 may continue to an operation 506.

At 506, the array manager 114 may, on lookup, access, or IC write, set an in-use bit of the corresponding cache line in the active array (array having the active array pointer).

At 508, the array manager 114 may detect if the active in-use array has an active array in-use capacity that reaches a threshold condition. When the threshold condition is not reached (following the "no" route from the decision operation 508), then processing may continue at the decision operation 504 as discussed above.

When the threshold condition is reached (following the "yes" route from the decision operation 508), then the array manager 114 may detect whether the next array (i.e. adjacent physical array) has a flush (or clear) pending at 510. When the flush is pending (following the "yes" route from the decision operation 510), then processing may continue at the decision operation 504 as discussed above.

When the flush is not pending (following the "no" route from the decision operation 510), then the process 500 may continue at an operation 512.

At 512, the μOP issue 126 may insert the marker into the pipeline 112. The marker may be tagged with the identifier (ID) of the currently active array. The active array is marked as "flush pending" state.

At 514, the array manager 114 may move the active array pointer to the next array. This operation makes the next array become the active array that starts to update the in-use bits from now on.

The active array pointer may move in a circular fashion through the various arrays, such as a array 1, array 2, ... array N. When the active array pointer reaches the array N, the active array pointer may then move back to the array 1.

Following the operation 514, the process 500 may return to the decision operation 504 to continue processing.

When the decision operation 504 detects that the marker did retire (following the "yes" route from the decision operation 504), the process 500 may continue to an operation 516. For example, the μOP issue 126 may detect that the marker has reached the retirement state 130 in the pipeline 112.

At 516, the array manager 114 may check the array ID of the marker.

At 518, the array manager 114 may flush (or clear) the array with a matching ID.

At 520, the array manager 114 may exit the flushed array from the "flush pending" state.

The process 500 may continue from the operation 520 to the operation 504 and continue processing as discussed above.

As discussed above, the in-use state of the cache lines may be detected using corresponding bits of the arrays for the particular bit using the OR operation as shown in Equ. (2):

$$\text{In-use} = \text{Array1}(x)\text{in-use} \| \text{Array2}(x)\text{in-use} \| \ldots \| \text{Array}n(x)\text{in-use}, \quad \text{EQU. (2)}$$

where x corresponds to the particular instruction. By using the in-use array in array 1, array 2, ... array n, the in-use result of Equation 2 creates less false in-useness outcomes than implementations where all the access data in the in-use array is marked as in-use when the marker operation flows through the pipeline.

In the process 500, multiple markers may be in the pipeline 112 (i.e., outstanding in the pipeline) at any given time. The more levels and more frequently the markers are inserted into the pipeline, the more precisely the array manager 114 may be able to track the in-use state of each cache line.

Figure 6:
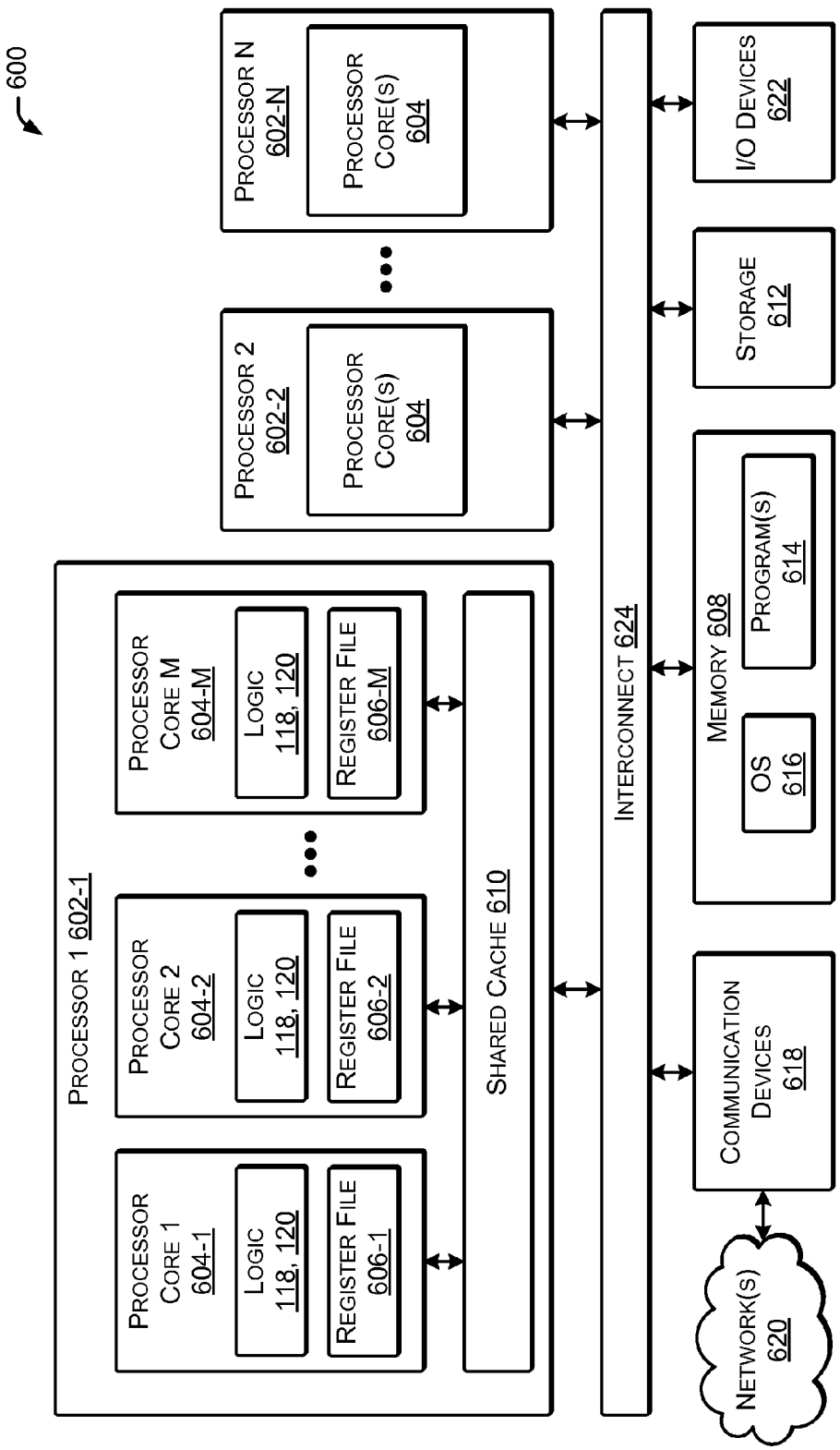
FIG. 6 is a block diagram of an illustrative architecture of a system to perform multi-level tracking of in-use states of cache lines.

FIG. 6 illustrates nonlimiting select components of an example system 600 according to some implementations herein that may include one or more instances of the processor architecture discussed above for implementing multi-level tracking of in-use states of cache lines. The system 600 may include one or more processors 602-1, 602-2, ..., 602-N (where N is a positive integer≥1), each of which may include one or more processor cores 604-1, 604-2, ..., 604-M (where M is a positive integer≥1). In some implementations, as discussed above, the processor(s) 602 may be a single core processor, while in other implementations, the processor(s) 602 may have a large number of processor cores, each of which may include some or all of the components illustrated in FIG. 6. For example, each processor core 604-1, 604-2, . . . , 604-M may include an instance of logic 124, 126 for performing latter stage read port reduction with respect to read ports of a register file 606-1, 606-2, . . . , 606-M for that respective processor core 604-1, 604-2, . . . , 604-M. As mentioned above, the logic 124, 126 may include one or more of dedicated circuits, logic units, microcode, or the like.

The processor(s) 602 and processor core(s) 604 can be operated to fetch and execute computer-readable instructions stored in a memory 608 or other computer-readable media. The memory 608 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 604, in some implementations, the multiple processor cores 604 may share a shared cache 610. Additionally, storage 612 may be provided for storing data, code, programs, logs, and the like. The storage 612 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 600, the memory 608 and/or the storage 612 may be a type of computer readable storage media and may be a non-transitory media.

The memory 608 may store functional components that are executable by the processor(s) 602. In some implementations, these functional components comprise instructions or programs 614 that are executable by the processor(s) 602. The example functional components illustrated in FIG. 6 further include an operating system (OS) 616 to mange operation of the system 600.

The system 600 may include one or more communication devices 618 that may include one or more interfaces and hardware components for enabling communication with various other devices over a communication link, such as one or more networks 620. For example, communication devices 618 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 600 may further be equipped with various input/output (I/O) devices 622. Such I/O devices 622 may include a display, various user interface controls (e.g., buttons, joystick, keyboard, touch screen, etc.), audio speakers, connection ports and so forth. An interconnect 624, which may include a system bus, point-to-point interfaces, a chipset, or other suitable connections and components, may be provided to enable communication between the processors 602, the memory 608, the storage 612, the communication devices 618, and the I/O devices 622.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
pointing an array selector to a first array;
tracking an in-use state of a plurality of instructions in the first array until the tracked in-use state of the plurality of instructions reaches a threshold condition;
redirecting the array selector to a second array;
inserting a marker operation into a pipeline;
tracking another in-use state of the plurality of instructions in the second array at least while the marker operation is in the pipeline;
clearing the in-use state of the plurality of instructions in the first array in response to retirement of the marker operation from the pipeline; and
allocating an entry storage in the plurality of instructions based at least in part on the in-use state tracked by the first and second arrays.

2. The method as recited in claim 1, wherein the detecting whether to allocate the entry storage in the plurality of instructions uses a binary OR operation of corresponding bits in the first and second arrays to detect whether a bit is in the in-use state.

3. The method as recited in claim 1, wherein the tracking of the in-use state of the plurality of instructions in the second array continues at least until (i) the tracked in-use state of the plurality of instructions in the second array reaches the threshold condition and (ii) the in-use state of the plurality of instructions in the first array are cleared.

4. The method as recited in claim 1, wherein the marker includes a physical identifier that indicates which array is to be cleared following retirement of the marker.

5. The method as recited in claim 1, wherein the in-use state tracks access data in an in-use array as a hit or a fill associated with one of the plurality of instructions.

6. The method as recited in claim 1, wherein the tracking another in-use state of the plurality of instructions in the second array occurs until the tracked in-use state of the plurality of instructions reaches the threshold condition; and further comprising:
redirecting the array selector to a third array; and
inserting another marker operation into the pipeline.

7. An apparatus comprising:
a storage unit having at least a first array and a second array having a plurality of entries to store an in-use array corresponding to a plurality of instructions, the in-use array indicating an in-use state for corresponding instructions;
a first logic to detect when the in-use array stored in the first array reaches a threshold condition;
a second logic to track the in-use array in the first array until the in-use array in the first array reaches the threshold condition;
a third logic to, when the in-use array of the first array reaches the threshold condition, perform acts including:
insert a marker operation into a pipeline,
track the in-use array in the second array, and
clear the in-use array from the first array in response to a retirement of the marker operation from the pipeline; and
a fourth logic to allocate an entry storage in one of the plurality of instructions based at least in part on the in-use array in the first and second arrays that track the in-use state of the plurality of entries.

8. The apparatus as recited in claim 7, wherein the third logic further is to update an active array pointer from the first array to the second array prior to tracking the in-use array in the second array.

9. The apparatus as recited in claim 7, wherein the in-use array indicates a hit or a fill associated with one of the plurality of instructions.

10. The apparatus as recited in claim 7, wherein the marker includes a physical identifier that indicates which array is to be cleared following retirement of the marker.

11. The apparatus as recited in claim 7, wherein the fourth logic is to detect whether to allocate the entry storage in the plurality of instructions using a binary OR operation of corresponding bits in the first and second arrays to detect whether a bit is in the in-use state.

12. The apparatus as recited in claim 7, wherein the third logic is to track the in-use state of the plurality of instructions in the second array at least until (i) the tracked in-use state of the plurality of instructions in the second array reaches the threshold condition and (ii) the in-use state of the plurality of instructions in the first array are cleared.

13. The apparatus as recited in claim 7, wherein the first logic is to detect when the in-use array stored in the second array reaches a threshold condition; and wherein the second logic tracks the in-use array in the second array until the in-use array in the second array reaches the threshold condition.

14. The apparatus as recited in claim 13, wherein the third logic, when the second logic detects that the in-use array of the second array reaches the threshold condition, is to perform acts including:

insert another marker operation into the pipeline, and track the in-use array in a third array.

* * * * *